United States Patent [19]

Ghering et al.

[11] Patent Number: 4,512,200
[45] Date of Patent: Apr. 23, 1985

[54] PULVERIZED COAL RELATIVE DISTRIBUTION METER

[75] Inventors: Walter L. Ghering, Alliance; William L. Thompson, Montville, both of Ohio

[73] Assignee: The Babcock & Wilcox Company, New Orleans, La.

[21] Appl. No.: 556,524

[22] Filed: Nov. 30, 1983

[51] Int. Cl.³ .............................. G01F 1/64; G01F 1/74
[52] U.S. Cl. .................................. 73/861.04; 73/196; 73/861.08
[58] Field of Search ............... 73/196, 861.04, 861.09; 324/454, 459, 464

[56] References Cited

U.S. PATENT DOCUMENTS 3,176,513  4/1965  Kriete .................................. 73/861.18
3,359,796 12/1967  Dimick ............................... 324/464 X
4,480,947 11/1964  Nagasaka .......................... 73/861.04

Primary Examiner—Herbert Goldstein
Attorney, Agent, or Firm—Vytas R. Matas; Robert J. Edwards

[57] ABSTRACT

An apparatus for measuring the relative flow of pulverized coal in a plurality of pipes connected between a common pulverizer and respective burners comprises a plurality of electric charge sensors each disposed in a similar position on the plurality of pipes. The electric sensors sense an induced signal produced by charged pulverized coal particles. For unbiased flow, the induced signal is proportional to the amount of flow in each pipe as the charge properties of the particles from the pulverizer are the same for all the pipes. A circuit is connected to the sensors for obtaining a root means square value of the induced signal which in turn is compared to each induced signal respectively to obtain a measurement of the relative flow in each pipe. The induced signal can be integrated twice to improve the correlation between flow and charge amount since the integrated value is independent of radial position for the charges in the pipes.

8 Claims, 8 Drawing Figures

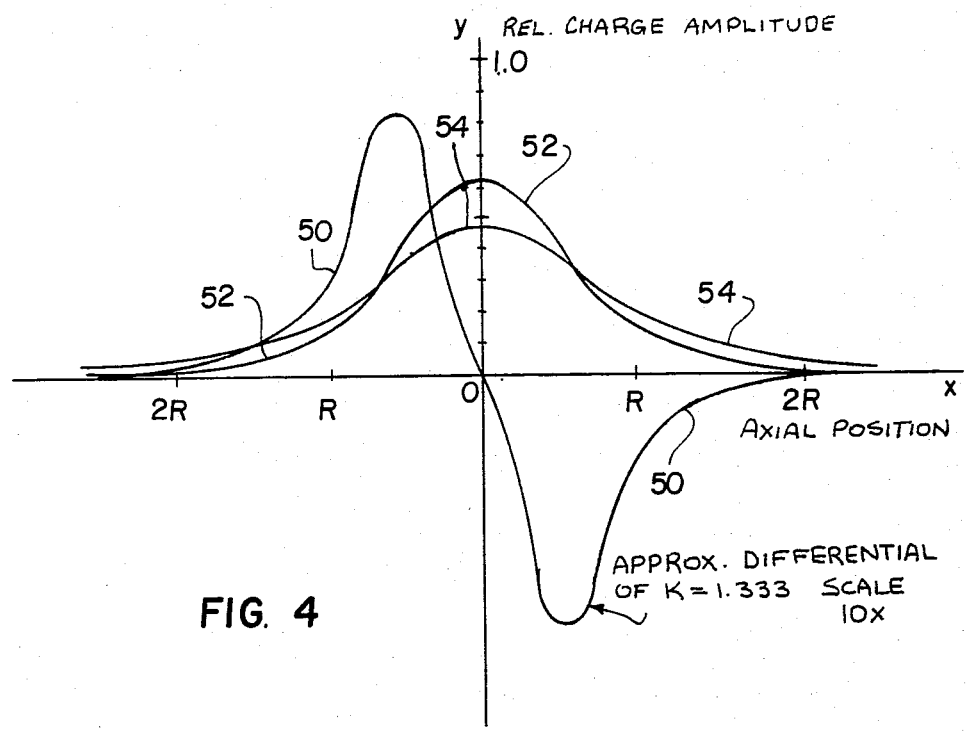
FIG. 4
FIG. 3B
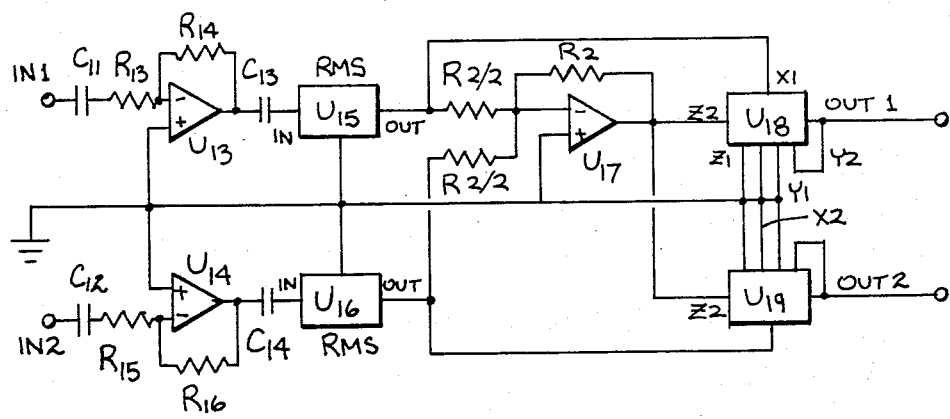

PULVERIZED COAL RELATIVE DISTRIBUTION METER

FIELD AND BACKGROUND OF THE INVENTION

The present invention relates in general to flow meters and in particular to a new and useful distribution meter for measuring the relative flow of pulverized coal to a plurality of burners in a coal fired installation.

The use of a pulverized coal/air mixture for firing power plants and the like is known. Coal having a relatively large particle size is provided to a pulverizer where it is ground to a smaller particle size and mixed with air. The air/pulverized coal mixture is then supplied over a plurality of pipes to a plurality of burners in a furnace or boiler.

Details concerning the preparation and use of pulverized coal as a fuel can be found in the publication STEAM, ITS GENERATION AND USE, 39th edition, Babcock and Wilcox Company 1978, at chapter 9.

At the present time it is not standard practice to measure the pulverized coal flow to the burners associated with a given pulverizer on either an absolute or a relative basis.

A current unsolved problem in this field, is that of uneven distribution of pulverized coal (pc) among the several burners served by a single pulverizer. This problem would be expected to be a function of load for a given set of pc distribution parameters and/or a function of time as the pc distribution parameters change. Uneven pc distribution to the burners leads to inefficient burning and poor control of stack emissions. For example, in designing the burner piping, the resistance of the primary air/pc mixture is calculated for each of the burner pipes for the maximum pulverizer load condition. These resistances are then balanced by the use of orifice plates suitably sized and placed in the pipes. Accurate verification of the pc distribution is not presently possible. However, it is known that the hydraulic resistance of the pipes is a function of the load. Thus, even if balanced pc distribution had been achieved at maximum pulverizer loading, the distribution would be unbalanced at a different load. Further, over a period of time the orifice plates (or other resistive elements placed in the pipes to balance the air flow) will wear or erode away; thus, the pc distribution would also change with time. This lack of knowledge (and control) of the pc distribution leads to suboptimum burning efficiency of the fuel and to lack of control of stack emissions. Accurate fuel distribution would enable lower excess air, raise boiler efficiency and reduce $NO_x$.

Flowing solid/air mixtures are known to have electrostatic and triboelectric properties. This includes a flowing pulverized coal/air mixture. See for example, P. W. King, "Mass Flow Measurement of Conveyed Solids by Monitoring Intrinsic Electrostatic Noise Levels", Pneumotransport 2, Univ. of Surry, Guildford, Engl., pp D2-9 to D2-20 (Sept. 1973);

I. D. Doig and G. H. Roper, "Fundamental Aspects and Electrostatic Influences in Gas-Solid Transportation Systems", Australian Chemical Engineering, pp. 9-17 (April 1963);

S. L. Soo, "Effect of Electrification on the Dynamics of a Particulate System", Ind. Eng. and Chem. Fundamentals 3, pp. 75-80 (Feb. 1964);

B. N. Cole, M. R. Baum, and F. R. Mobbs, "An Investigation of Electrostatic Charging Effects in High-Speed Gas-Solids Pipe Flows", Proc. Instn. Mech. Engrs. 184 (3C), pp 77-83 (1969-70);

D. J. Montgomery, "Static Electrification of Solids", Solid State Physics 9, Academic Press, N.Y., pp 139-197 (1959);

B. A. Batch, J. Dalmon, and E. T. Hignett, "An Electrostatic Probe for Measuring the Particle Flux in Two-Phase Flow", C.E.R.L. Lab Note. No. RD/L/N 115/63

K. Min, B. T. Chao, and M. E. Wyman, "Measurement of Electrostatic Charge on Solid Particles in Solid-Gas Suspension Flow", The Review of Scientific Instruments 34(5), pp. 529-531 (May 1963); and E. W. B. Gill, G. F. Alfrey, "Frictional Electrification", Nature 163, p. 172 (Jan. 1947).

Up til now however, no reliable correlation has been found between the sensed electrostatic charge of flowing pulverized coal in particular, and the flow parameters such as velocity, density and mass flow rate.

SUMMARY OF THE INVENTION

According to the invention, a solution is provided for the problem of uneven distribution of pulverized coal to a plurality of burners served by a single pulverizer.

The solution of the invention is primarily drawn to a detector which is most useful in detecting the relative flow in a plurality of pipes so-called light phase pulverized coal. Light-phase pulverized coal is loosely defined as having a mass ratio for the coal to air mixture of from about 0.1 to about 50. This includes a pulverized coal content of up to about 4 $lb/ft^3$.

The first step in solving the problem of uneven distribution, is to measure the pc distribution to the several burners associated with a given pulverizer. For this purpose, and in accordance with the invention, a relative distribution meter based on electrostatic principles is used. Since the mass flow of the primary air and crushed coal for a pulverizer are (usually) known, a mass flow meter in each line is not necessary. A knowledge of the relative distribution of these components is all that is required.

The electrostatic distribution meter of the invention, is based on the principle of electrostatic charge induction in an electrode due to a charged particle or particles near the electrode. If an electrode is held at ground potential by a suitable electronic circuit, then the charge induced in the electrode by the passing charged particle causes a current flow through the electronic circuit. Thus, a signal can be generated that indicates the flow of charged particles past the electrode. Experimental observation of this electrostatic induced signal on pc transit pipes indicates that it is suitable for velocity and relative distribution determinations. The pc relative distribution meter readout can be used as a measure of the pc system operation. When the pc distribution becomes unduly unbalanced, then corrective action can be taken, e.g., balance with adjustable orifices. The ideal use of a distribution meter is on-line with suitable controls to establish and maintain uniform pc distribution as a function of system and load changes.

The invention is based on a common source of electrostatically charged particles (the pulverizer) which, for balanced flow, have an equal probability of transit through any of the distribution pipes (the pc pipe to each burner). The electrode sensors are located at similar positions in each pipe; thus, for balanced distribution of the charged particle flows, equivalent signals should be obtained from each pipe. Similarly, unbalanced distribution of the charged particle flows will be indicated by an unbalance of the induced electrostatic signals.

A preferred method for signal processing is to use charge flux, a value proportional to the second integral of the induced signal, as a measure of the flow through the pipe.

An optional method is to use the RMS value of the induced signal as an estimate of the flow through the pipe.

The pc distribution meter based on electrostatic signals has a number of merits. These include the following:

No obstruction to the flow of pc;
No loss due to pressure changes;
A continuous pc distribution signal;
The use of electrodes held at ground potential thus, no explosion hazard; and
Simple electronic signal processing.

Experiments and analysis have revealed that signals suitable for measurement purposes should be present in the pc distribution piping, signal processing can remove the effects of uneven pc distribution in a given pipe, and the concept of an electrostatic distribution meter should be applicable to most power plant pc systems.

The invention consists of the following components: suitable electrodes in each of the pc pipes on a pulverizer; suitable electronics to convert the electrostatic and/or triboelectric sensor response into an electrical signal suitable for processing; and a suitable signal processor to generate and indicate the normalized relative distribution of the pc in the pipes. The RMS value of the fluctuating signal from a given sensor can be used as an estimate of the relative amount of pc transiting past that sensor. However, the preferred method is to use charge flux, a value proportional to the second integral of the induced signal, as a measure of the relative flow through the pipe. Note that only a relative signal is needed, thus, the problems associated with an absolute signal are avoided. All that is required is similar conditions in each pipe.

To establish these similar conditions, the pulverized coal distribution pipes must each come from a common source of pulverized coal/air flow, such as a single pulverizer, it has been found that, not only a signal which is useful for velocity measurement but also one which is useful for relative mass flow measurement can be obtained.

A signal which is useful for relative comparison of mass flow among the distribution pipes can be obtained from the second integral of the induced signals, rather than the induced signals directly. Thus, the electronic signal processing equipment should be capable of obtaining the second integral of the induced signal.

Accordingly, an object of the present invention is to provide a scheme for measuring the relative flow of pc in a plurality of pipes coming from a pulverizer, which measurement can be utilized to balance the flow among the pipes.

A further object of the invention is to provide an apparatus for measuring the relative flow of pulverized coal in a plurality of pipes between a common pulverizer and a respective plurality of burners, comprising a plurality of electric charge sensors, each connected to one pipe at a selected position with respect to the pulverizer, and each for producing an induced signal caused by the passage of charged pulverized coal particles, the selected positions for each sensor being similar to each other, circuit means connected to the sensors for processing each induced signal to obtain a value of the charge flux for the induced signals and, comparator means connected to the circuit for comparing the value of the charge flux of each induced signal as a measurement of the relative flow in each pipe respectively.

A still further objective of the invention is to provide such an apparatus wherein the circuit means includes means for taking the root mean square value of the induced signal to be used for obtaining an estimate of the flow through the pipes and comparing these estimates.

Another object of the invention is to provide appropriate configurations for the electric charge sensors.

Another object of the invention is to provide a method of measuring the relative flow of pulverized coal in a plurality of pipes between a common pulverizer and a respective plurality of burners utilizing electric charge sensors similarly positioned in each pipe with respect to the pulverizer to measure induced signals caused by the passage of charged pulverized coal particles, the double integration of these induced signals to obtain an integrated signal, the comparison of the integrated signals which correspond to the relative amount of flow in each respective pipe.

A still further object of the invention is to provide an apparatus for measuring relative pulverized coal flow in a plurality of pipes which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3B is a view similar to FIG. 3A of an RMS circuit;

FIG. 4 is a graph showing the relationship between position and electrostatic induced chargers for an electric charge sensor in a pipe for carrying pulverized coal;

DESCRIPTION OF THE PREFERRED EMBODIMENTS

Figure 1:
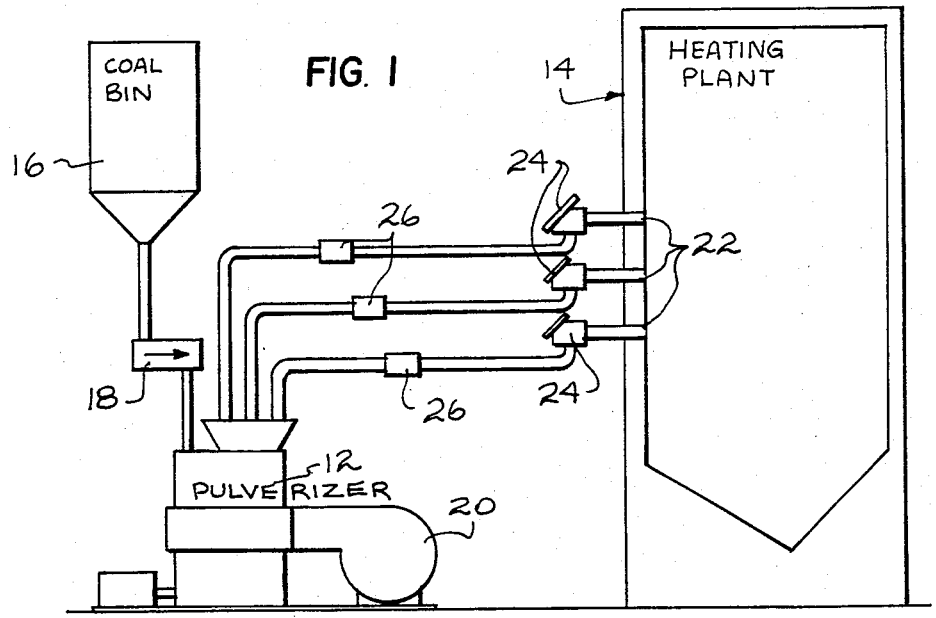
FIG. 1 is a diagrammatical representation of a heating plant serviced by a plurality of burners supplied with a pulverized coal/air mixture from a common pulverizer.

Referring to the drawings in particular, the invention embodied therein comprises an apparatus for measuring the relative flow of pulverized coal on a plurality of pipes 10 connected between a common pulverizer 12 and a heating plant 14, which may for example be a tube boiler.

Pulverizer 12 is supplied with coal from a bin 15 and over a feeder 18. The coal is pulverized to a small grain size and mixed with air with the aid of a blower 20. The thus pulverized coal is conveyed by air flow over pipes 10 and into burners 22 from which the pulverized coal/air mixture is injected into the heating plant to be burned as a fuel. Each of the burners or pipes may be provided with an adjustable orifice or valve means 24 which is capable of adjusting the relative flow of pulverized coal in each pipe.

In accordance with the invention, each pipe is fitted with a sensor 26. Each sensor is placed at a similiar position in each respective pipe 10 with respect to the pulverizer 12 so that the static properties of the pulverized coal particles is similar in each pipe. Each sensor 26 is configured to be capable of measuring an induced signal produced by the passing charged particles. The particles may be charged positively or negatively. Only one half of a full ac cycle is utilized for each sensor since the charge flux signal response is similar for either positive or negative charge.

Figure 2:
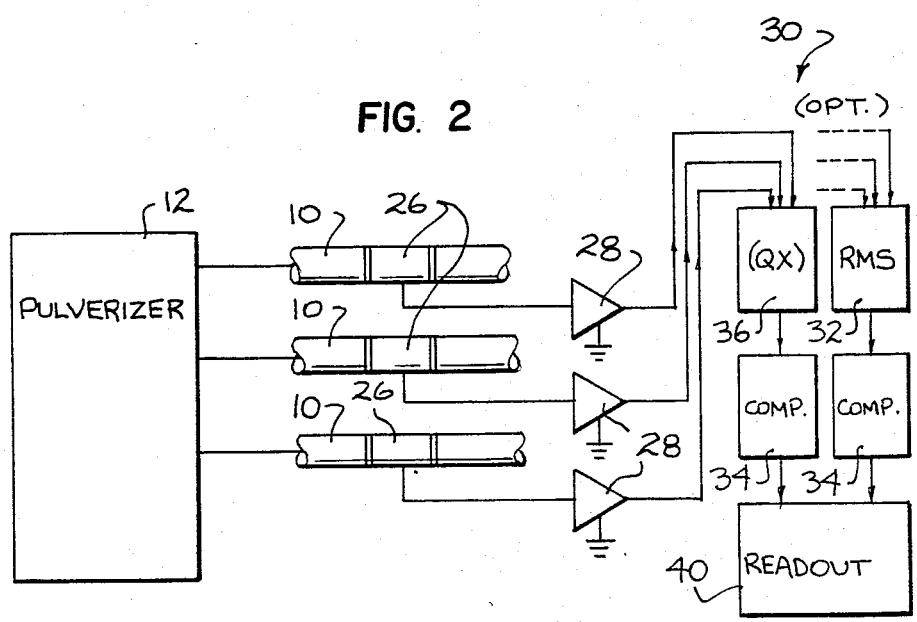
FIG. 2 is a block representation of the apparatus for measuring relative flow in the pipes, in accordance with the invention.

Referring to FIG. 2, the pulverizer 12 is considered as a source of electrostatically (or triboelectrically) charged particles. Each sensor 26 is connected to a respective amplifier 28 which produces an amplified induced signal that is supplied to circuit means generally designated 30. Circuit means 30 includes an optional circuit component 32 for obtaining the root means square of each of the induced signals, a comparator 34 for comparing the root means square value to each induced signal value to obtain a measurement of the relative flow in each of pipes 10. A circuit component 36, in accordance with a preferred form of the invention, is provided to obtain a double integral of the induced signal. This has been found to avoid problems of position and geometry of the charge particles within the pipes.

A readout device 40 is connected to circuit means 30 to provide a readout and/or a control signal which can be utilized, in a manner not here disclosed in detail, to control the orifices or valves 24 and thus equalize the flow in each of the pipes 10.

FIG. 4 illustrates the generation of an induced electrostatic signal on line 50 as a charged "packet" of pulverized coal passes a sensor, the center of which is a position zero on the x axis. The x axis is taken along the axis of pipe 10 with distances measured in terms of R, the radius of the pipe. The y axis is a relative charge amplitude.

The curve 52 shows the characteristic of the relative charge amplitude for K = 1.333 where:

$$\frac{1}{K} = \frac{x_1 - x_0}{R} \qquad (1)$$

where $x_1$ is the center of pipe 10 having radius R and the packet of charge is assumed to be at radius position $x_0$ in the tube. Thus, curve 52 shows the charge amount distribution when the packet is near the wall. Curve 54 shows the case where K approaches infinity, that is the packet is near the center of the pipe.

This distribution of charge amount demonstrates how the double integration of the induced signal can produce a quantity (QX or charge flux) which is substantially independent of radial position.

Since this change in charge per change in distance is proportional to the current or induced signal, integrating produces:

$$\frac{dq(x)}{d(x)} dx = q(x). \qquad (2)$$

Integrating again results in:

$$q(x)dx = (QX) \qquad (3)$$

The (QX) values are then taken and compared to the average (QX) value to determine the relative flow in each pipe 10.

Figure 3A:
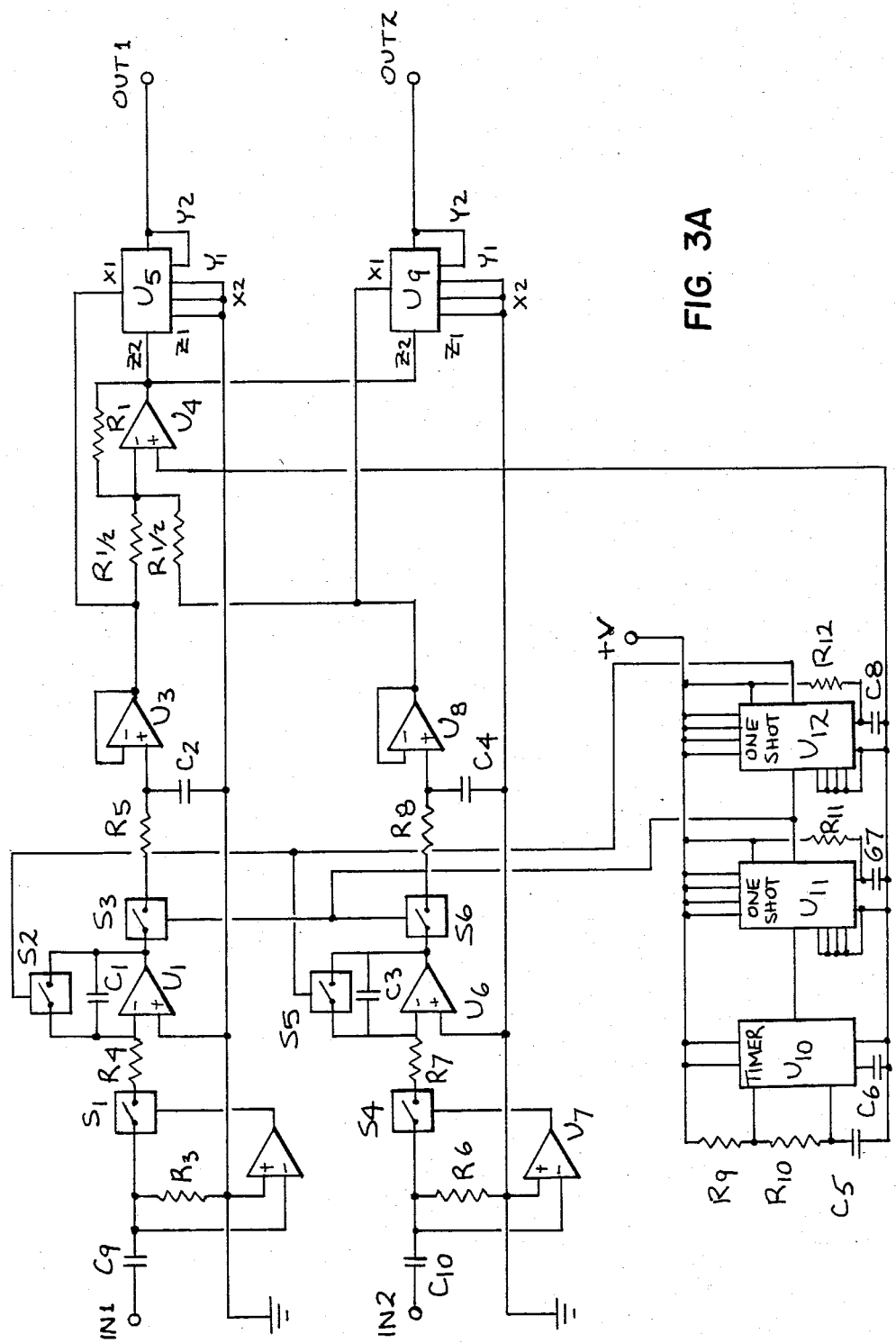
FIG. 3A is a schematic diagram showing an example of a charge flux circuit which can be used in accordance with the invention.

FIG. 3A shows an example of a circuit for achieving the invention for the relative flow in two pipes.

Opamps $U_1$ and $U_6$ are used as integrators. Their action is controlled by switches $S_1$, $S_2$, $S_4$ and $S_5$. Opamps $U_2$ and $U_7$ select the positive going wave and turn on switches $S_1$ and $S_4$ respectively to permit integration over the positive portion. $U_1$ and $U_6$ integrate for a period determined by timer $U_{10}$. At suitable intervals the charge on $C_1$ and $C_3$ is dumped by switches $S_2$ and $S_5$. Prior to this, the peak value of the integrated signals is sampled by $S_3$ and $S_6$ respectively and integrated by $R_5$–$C_2$ and $R_8$–$C_4$ combinations to yield the second integral. The switching and sampling is controlled by timer $U_{10}$ and one-shots $U_{11}$ and $U_{12}$.

$U_4$ takes the average of the two signals by acting as a summer with gain of ½ to each signal. The divider circuits, $U_5$ and $U_9$ take the ratio of each signal to their average.

In FIG. 3B, the RMS and configuration, $U_{13}$ and $U_{14}$ amplify the signals appropriately and present them to the RMS converters $U_{15}$ and $U_{16}$. $U_{17}$ takes the average and $U_{18}$ and $U_{19}$ compare the individual signals to the averages.

Typical available circuits used for: $U_1,U_2,U_3,U_4,U_6,U_7,U_8,U_{13},U_{14},U_{17}$ is the National LF 356; for $U_5,U_9,U_{18},U_{19}$ the Analog Devices AD535; for $U_{10}$ the National LM555; for $U_{11},U_{12}$ the Motorola MC 14538; for $U_{15},U_{16}$ the Analog Devices AD 536A; and for $S_1,S_2,S_3,S_4,S_5$ and $S_6$ the RCA CD 4066 B.

Figure 5:
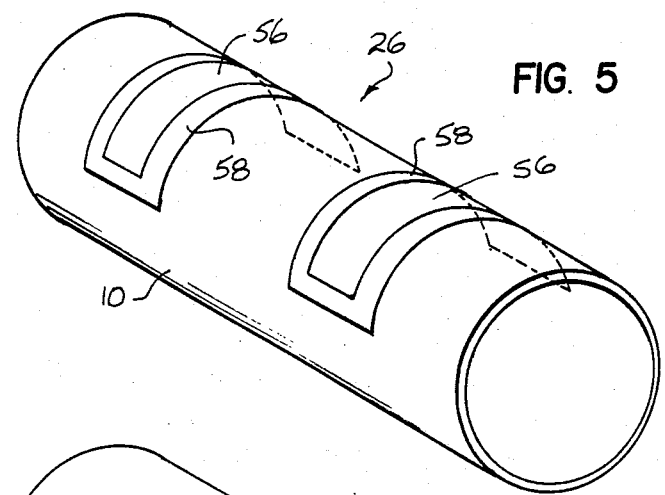
FIG. 5 is a perspective view of a configuration for an electric charge sensor in accordance with the invention.

FIG. 5 shows one embodiment of the electrode for picking up the electrode static/triboelectric charge of particles passing in the pipe 10. The electrode 26 comprises, in the embodiment as shown in FIG. 5, two electrode plates 56 which extend around approximately 180° of the pipe 10 and are electrically insulated from the pipe by insulation 58. Each electrode plate 56 is about D/2 in axial length on the axis of pipe 10 with the center to center spacing of plates 56, being about 3D where D is pipe diameter.

Such electrode pairs can be used for determining the pc velocity by correlation of the induced signals.

Figure 6:
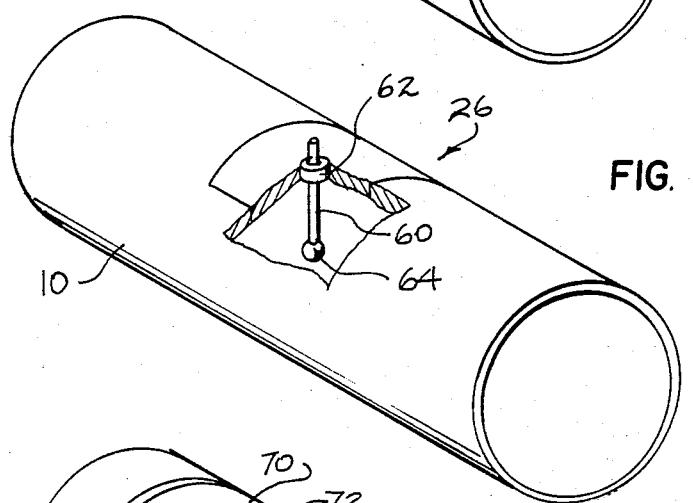
FIG. 6 is a view similar to FIG. 5 of another embodiment of the sensor.

FIG. 6 shows an alternate form of the invention wherein a rod electrode 60 is utilized which is mounted in an insulating mounting 62 and has a ball 64 for receiving the charge amount from the flow of pulverized coal within pipe 10.

Figure 7:
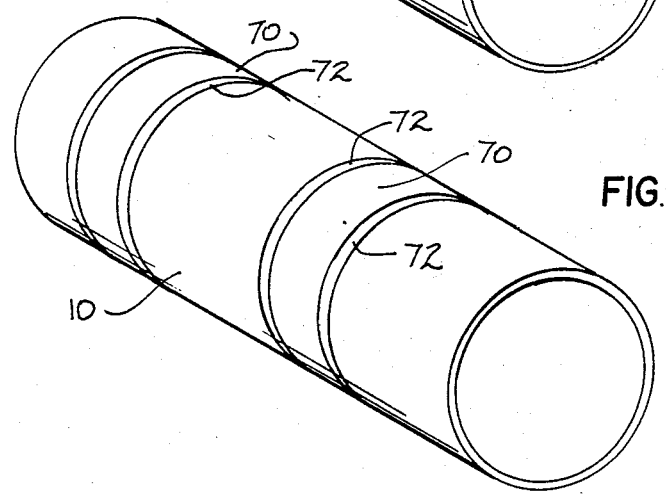
FIG. 7 is a view similar to FIG. 5 of a still further embodiment of the sensor.

FIG. 7 shows the use of a Faraday cage type sensor comprising two spaced apart rings 70, 70 which are each electrically insulated from pipe 10 by insulation 72. Electroplates 70, 70 each have an axial length of about D/2 with a center to center spacing of about 3D where D is pipe diameter.

Such electrode pairs can be used for determining the pc velocity by correlation of the induced signals.

While specific embodiments of the invention have been shown and described in detail to illustrate the application of the principles of the invention, it will be understood that the invention may be embodied otherwise without departing from such principles.

What is claimed is:

1. An apparatus for measuring the relative flow of pulverized coal in a plurality of pipes connected between a common pulverizer and a respective plurality of burners, comprising:
   a plurality of electric charge sensors, each connected to one pipe at a selected position with respect to the pulverizer, and each for producing an induced signal caused by the passage of charged pulverized coal particles, the selected position for each sensor being similar to each other;
   first circuit means connected to said sensors for processing each induced signal to obtain a value of the charge flux, a value proportional to the second integral of the induced signal; and
   comparator means for comparing the values of the charge flux for each induced signal as a measurement of the relative flow in each pipe.

2. An apparatus according to claim 1, including second circuit means associated with said first circuit means for obtaining the the root mean square of each signal to be used as an estimate of the relative flow in each pipe.

3. An apparatus according to claim 1, wherein each of said electric charge sensors comprises an electroplate connected to a respective pipe and electrically insulated from the respected pipe.

4. An apparatus according to claim 3, wherein said electroplate comprises a faraday cage ring around the respective pipe.

5. An apparatus according to claim 3, wherein the electroplate comprises a curved member extending partly around the respective pipe and connected to the respective pipe by electrically insulating material.

6. An apparatus according to claim 1, wherein each electric charge sensor comprises a rod extending into each respective pipe and electrically insulated from each respective pipe, said rod being electrically conductive.

7. A method of measuring the relative flow of pulverized coal in a plurality of pipes connected between a common pulverizer and a respective plurality of burners, comprising:
   positioning an electric charge sensor in each pipe at a similar position with respect to the pulverizer, the sensor being capable of measuring a charge in the pipe and for producing an induced signal;
   passing pulverized coal from the pulverizer through each pipe to produce induced signals in each sensor;
   obtaining a value of the charge flux for each of the induced signals; and
   comparing the values of the charge flux with each induced signal to obtain a measurement of the relative flow of each pipe respectively.

8. A method according to claim 7, including obtaining the root mean square value of the induced signals as an estimate of the flow through each pipe and for comparing the root mean square values for determination of an estimate of the relative flow of each pipe respectively.

* * * * *

UNITED STATES PATENT AND TRADEMARK OFFICE
CERTIFICATE OF CORRECTION

PATENT NO. : 4,512,200

DATED : April 23, 1985

INVENTOR(S) : Walter L. Ghering & William L. Thompson

It is certified that error appears in the above-identified patent and that said Letters Patent are hereby corrected as shown below:

Column 6, line 5, change the formula to $$\frac{d_q(x)}{d(x)} \, dx = q(x).$$

Column 6, line 10, change the formula to $$q(x) \, dx = (Qx).$$

Signed and Sealed this

Sixth Day of January, 1987

Attest:

DONALD J. QUIGG

Attesting Officer     Commissioner of Patents and Trademarks

UNITED STATES PATENT AND TRADEMARK OFFICE
CERTIFICATE OF CORRECTION

PATENT NO.   : 4,512,200

DATED        : April 23, 1985

INVENTOR(S)  : Walter L. Ghering et al.

It is certified that error appears in the above-identified patent and that said Letters Patent is hereby corrected as shown below:

Column 2, line 16, "til" should read -- until --.

Signed and Sealed this

Seventeenth Day of March, 1987

Attest:

DONALD J. QUIGG

*Attesting Officer*           *Commissioner of Patents and Trademarks*